United States Patent [19]
Batson et al.

[11] Patent Number: 5,609,465
[45] Date of Patent: Mar. 11, 1997

[54] METHOD AND APPARATUS FOR OVERSPEED PREVENTION USING OPEN-LOOP RESPONSE

[75] Inventors: Brett W. Batson, Dallas Center; Byron K. Broussard, West Des Moines, both of Iowa

[73] Assignee: Compressor Controls Corporation, Des Moines, Iowa

[21] Appl. No.: 533,517

[22] Filed: Sep. 25, 1995

[51] Int. Cl.⁶ .................................................. F01D 17/06
[52] U.S. Cl. .................................... 415/1; 415/15; 415/36
[58] Field of Search ............................... 415/1, 15, 36, 415/42, 43; 60/39.281

[56] References Cited

U.S. PATENT DOCUMENTS

| | | |
|---|---|---|
| 3,698,829 | 10/1972 | Kubo et al. ............................ 415/36 |
| 3,874,167 | 4/1975 | Katsume et al. . |
| 4,045,955 | 9/1977 | Brannstrom et al. . |
| 4,117,668 | 10/1978 | Elsaesser et al. . |
| 4,354,800 | 10/1982 | Kuwabara ............................ 415/36 |
| 4,658,590 | 4/1987 | Higashi et al. ........................ 415/36 |
| 5,180,923 | 1/1993 | Tyler . |
| 5,252,860 | 10/1993 | McCarty et al. . |
| 5,272,637 | 12/1993 | Urshidani et al. . |

*Primary Examiner*—James Larson
*Attorney, Agent, or Firm*—Henderson & Sturm

[57] ABSTRACT

A method and apparatus are disclosed for controlling the rotational speed of gas and steam turbines, and hot gas expanders, with each of these drivers driving a rotational load by way of a shaft. To accomplish this control technique, it is necessary to easily and accurately calculate the amount of power which must be shed by the driver(s) to maintain a constant speed, i.e., neither accelerating nor decelerating. Action must be taken to reduce the power applied to the shaft by this amount. The method incorporates an open-loop approach and uses a time derivative to moderate the open-loop action accordingly.

16 Claims, 2 Drawing Sheets

METHOD AND APPARATUS FOR OVERSPEED PREVENTION USING OPEN-LOOP RESPONSE

TECHNICAL FIELD

This invention relates generally to a method and apparatus for controlling the rotational speed of gas turbines, steam turbines, and hot gas expanders. More particularly, the invention relates to a method that utilizes an open-loop control approach which prevents these drivers from exceeding a speed threshold value (overspeed).

1. Background Art

Rotating machinery, such as turbines and expanders are subject to a variety of sudden changes (e.g., loss of load or coupling failures) that can result in rapid acceleration to unsafe speeds. Under these load changing conditions, it is important to maintain a fairly constant speed to avoid overspeed, or for the sake of the process; for example, when one of the loads is a compressor or pump.

Present-day overspeed protection devices employ mechanical trips that immediately initiate a shutdown when the mechanical overspeed trip speed is exceeded. This method is sometimes supplemented by an electronic system that counters overspeed situations before the mechanical system is actuated. The electronic approach serves as the drivers' first line of defense, while the mechanical system provides the primary fail-safe protection.

2. Disclosure of the Invention

The purpose of this invention is to provide a control method for arresting the acceleration of a turbine or expander. This method of improved control employs an open-loop approach using a time derivative to moderate the open-loop action accordingly, that is, by using values of rotational speed at each control-loop scan time, along with the time between scan samples, and a known value of the moment of inertia, I, to calculate $$\frac{I}{2} \frac{dN^2}{dt} = P_D - P_L$$

where:
I=moment of inertia of rotating parts
N=rotational speed
t=time
$P_D$=power applied to a shaft
$P_L$=power extracted from a shaft From the above equation, it can be seen that, in order to maintain a constant speed, $P_D$ must be exactly balanced with $P_L$; $P_D-P_L$ the amount of power that must be shed by the driver(s) to maintain the current speed—neither accelerating nor decelerating.

This open-loop control method can be applied to the following drivers:

(1) Gas Turbine—The fuel valve must be stepped down sufficiently to reduce its shaft power output to balance the power.

(2) Steam Turbine—The steam flow through the turbine must be reduced by closing the steam rack or throttle valve.

(3) Hot Gas Expander—Flow through an expander is reduced by closing the inlet valve and/or by opening a bypass valve.

When one of these three applications is initiated, and the acceleration is arrested, a speed set point is established and closed-loop control applied.

BEST MODE FOR CARRYING OUT THE INVENTION

To prevent overspeed of a turbine or an expander (each driving a load by way of a shaft), rotational speed must be quickly and accurately controlled by reducing the power applied to the shaft. Incorporation of both an open-loop approach and a derivative moderator contribute to improving the control of these drivers. The required magnitude of an open-loop method can be estimated to a high degree of accuracy by using the following governing equation of rotational dynamics $$\frac{I}{2} \frac{dN^2}{dt} = P_D - P_L$$

where:
I=moment of inertia of rotating parts
N=rotational speed
t=time
$P_D$=power applied to a shaft
$P_L$=power extracted from a shaft The method for impeding the overspeed of rotating machinery is initiated by defining a speed threshold value, then measuring and recording a rotational speed (N) of the shaft at various intervals of time ($\Delta t$). Next, a value of $IdN^2/2dt$ is calculated, which represents the difference in power applied to the shaft and power extracted from the shaft ($\Delta P$). When rotational speed exceeds the speed threshold value, this difference is used to calculate a new set point for a manipulated parameter on the driver to decrease its power production accordingly; and then adjusting this parameter by taking into account time lags and other uncertainties to meet the new set point.

Figure 1:
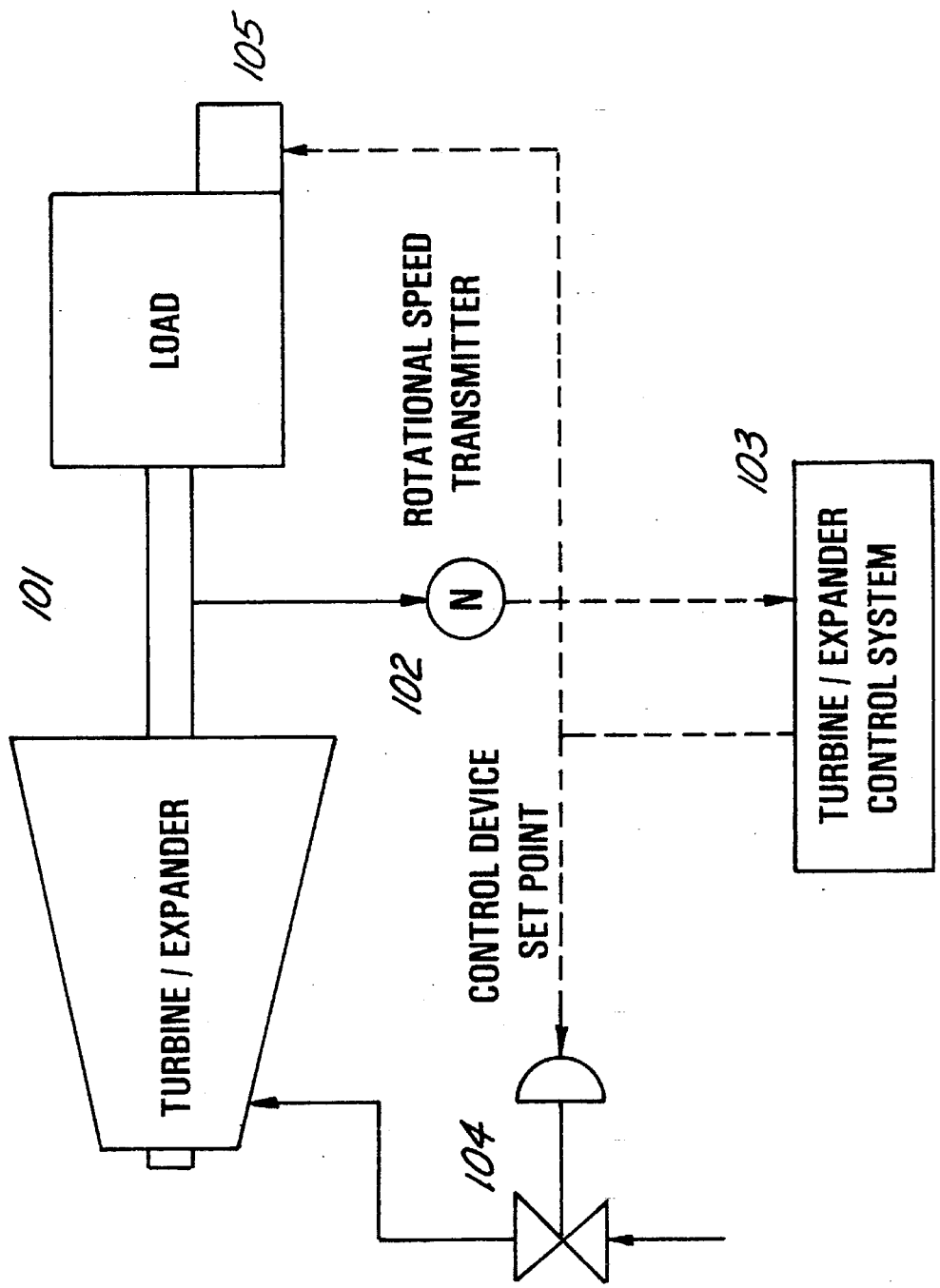
FIG. 1 shows a turbine/expander setup and control scheme.

FIG. 1 depicts the proposed control method for a turbine/expander setup 101, where N is sensed by a speed transmitter 102. The measured speed signal interacts with a turbine/expander control system 103 which, in turn, transmits a signal to a control device 104 or a manipulated parameter on the load (105). At this time, power produced by the driver is decreased as long as the rotational speed exceeds the speed threshold value.

Figure 2:
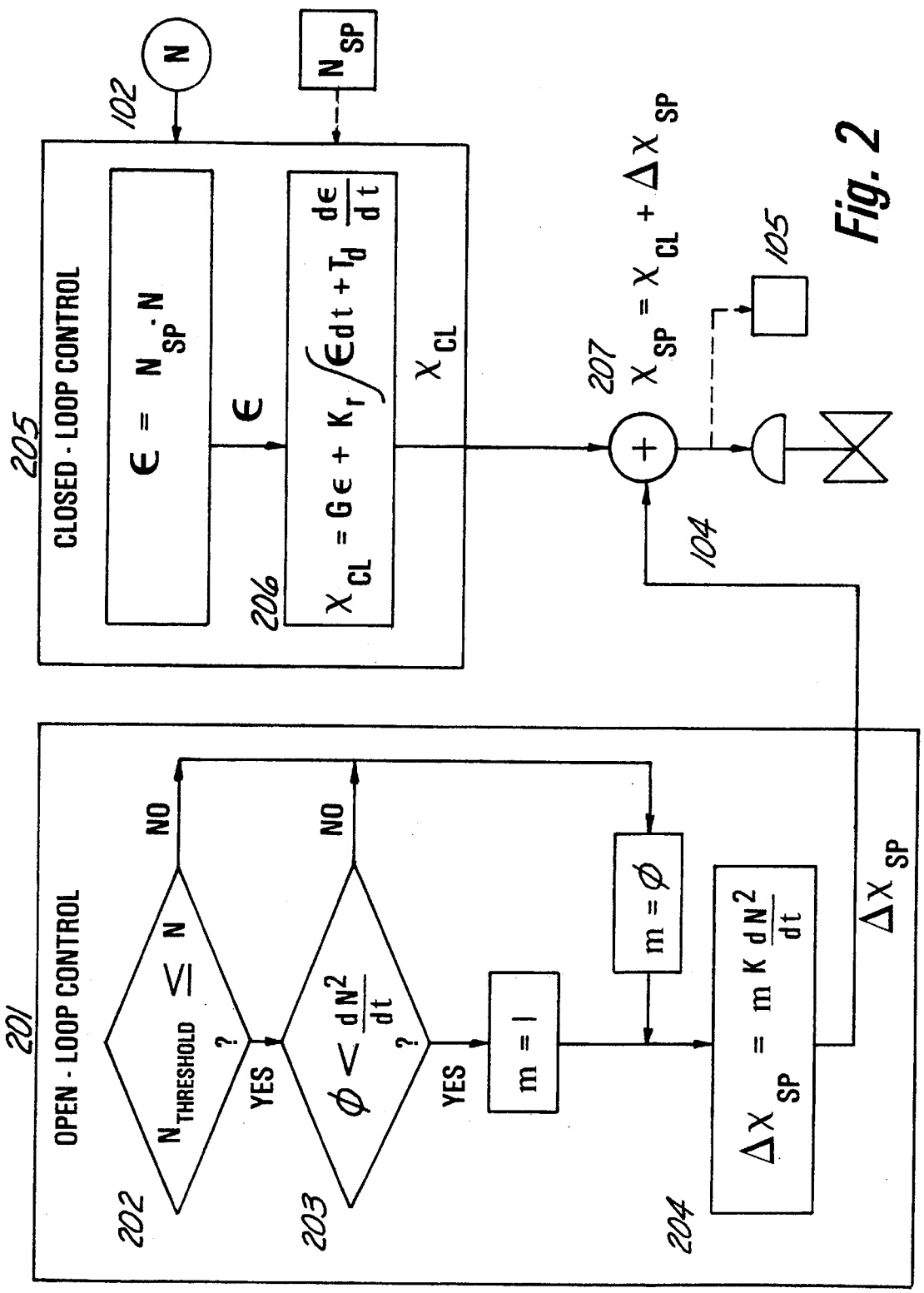
FIG. 2 shows a block diagram of a control scheme for a turbine/expander control system.

FIG. 2 displays a block diagram of both an open-loop 201 and closed-loop 205 control scheme which, when combined, make up a turbine/expander control system 103 (FIG. 1). The open-loop flowchart 201 shows that if either condition 202 or 203 is false, the change ($\Delta x_{SP}$) will equal zero, otherwise the change becomes the calculated open-loop set point increment, $\Delta x_{SP}$ 204,
where:
N=rotational speed
K=constant
t=time The closed-loop flowchart 205 shows a PID output, $x_{CL}$ 206,
where:
$N_{SP}$=rotational speed set point
$\epsilon$=error (%)

G=gain $K_r$=reset rate constant (repeats/minute)

$T_d$=derivative action time constant (seconds)

The open-loop value ($\Delta x_{SP}$) and the closed-loop value ($x_{CL}$) are then combined to obtain a set point calculation, $x_{SP}$ 207, which is transmitted to a control device 104.

Obviously many modifications and variations of the present invention are possible in light of the above teachings. It is, therefore, to be understood that within the scope of the appended claims, the invention may be practiced otherwise than as specifically described.

We claim:

1. A method to stop an angular acceleration of a driver driving a rotational load by way of a shaft, the entire set of rotational parts having a moment of inertia, I, the method comprising the steps of:

(a) measuring an angular speed, N, Of the shaft at various times;

(b) recording a sample time between each of these measurements, $\Delta t$;

(c) calculating a value of $N^2$ at each of these sample times;

(d) calculating a time derivative, $dN^2/dt$, based on the calculated values of $N^2$ at the various times and the times between each sample, $\Delta t$;

(e) multiplying the value of $dN^2/dt$ by the total inertia, I, of all rotating parts and dividing by two, thereby calculating a difference between a power applied to the shaft and a power extracted from the shaft, $\Delta P$;

(f) evaluating, based on the value of $\Delta P$ calculated in the prior step, the required change in a manipulated parameter to reduce the driver's power to balance the power applied to the shaft with the power extracted from the shaft;

(g) defining a set point for the manipulated parameter based on the evaluation; and (h) adjusting the manipulated parameter to meet the set point.

2. A method to reduce the magnitude of an angular acceleration of a driver driving a rotating load by way of a shaft, the entire set of rotating parts having a moment of inertia, I, and rotating at an angular speed, N, the method comprising the steps of:

(a) using a value of $IdN^2 2dt$ a measure of a difference between a power applied to the shaft and a power extracted from the shaft;

(b) using the difference to calculate a new set point for a manipulated parameter on the driver to reduce its power output accordingly; and (c) adjusting the manipulated parameter to meet the new set point.

3. The method of claim 2, whereby the procedure is subsequently repeated.

4. A method to prevent overspeed of rotating machinery consisting of a driver driving a load by way of a shaft, the rotating parts having a moment of inertia, I, and a rotational speed value, N, at which the machinery is said to have exceeded a speed threshold value, the method comprising the steps of:

(a) defining the speed threshold value;

(b) measuring a rotational speed as a function of time;

(c) calculating a value of $IdN^2/2dt$, representing a difference in a power applied to the shaft and a power extracted from the shaft, when the rotational speed exceeds the speed threshold value;

(d) determining a new set point for a manipulated parameter for the driver, based on the power difference; and (e) adjusting the manipulated parameter to meet the new set point.

5. The method of claim 4, wherein the step of determining a new set point for a manipulated parameter is based on the value of $IdN^2/2dt$ multiplied by a constant.

6. The method of claim 4 in which the manipulated parameter is adjusted periodically, as long as the rotational speed exceeds the speed threshold value.

7. The method of claim 4, whereby the manipulated parameter is also subject to closed-loop control.

8. A method to reduce the magnitude of an angular acceleration of a driver driving a rotational load by way of a shaft, the entire set of rotating parts having a moment of inertia, I, and rotating at an angular speed, N, the method comprising the steps of:

(a) using a value of $IdN^2/2dt$ as a measure of a difference between a power applied to the shaft and a power extracted from the shaft;

(b) using the difference to calculate a new set point for a manipulated parameter on the load to increase its power consumption accordingly; and (c) adjusting the manipulated parameter to meet the new set point.

9. An apparatus for stopping an angular acceleration of a driver driving a rotational load by way of a shaft, the entire set of rotational parts having a moment of inertia, I, the apparatus comprising:

(a) means for measuring an angular speed, N, of the shaft at various times;

(b) means for recording a sample time between each of these measurements, $\Delta t$;

(c) means for calculating a value of $N^2$ at each of these sample times;

(d) means for calculating a time derivative, $dN^2/dt$, based on the calculated values of $N^2$ at the various times and the times between each sample, $\Delta t$;

(e) means for multiplying the value of $dN^2/at$: by the total inertia, I, of all rotating parts and dividing by two, thereby calculating a difference between a power applied to the shaft and a power extracted from the shaft, $\Delta P$;

(f) means for evaluating, based on the value of $\Delta P$ calculated in the prior step, the required change in a manipulated parameter to reduce the driver's power to balance the power applied to the shaft with the power extracted from the shaft;

(g) means for defining a set point for the manipulated parameter based on the evaluation; and (h) means for adjusting the manipulated parameter to meet the set point.

10. An apparatus for reducing the magnitude of an angular acceleration of a driver driving a rotating load by way of a shaft, the entire set of rotating parts having a moment of inertia, I, and rotating at an angular speed, N, the apparatus comprising:

(a) means for using a value of $IdN^2/2dt$ as a measure of a difference between a power applied to the shaft and a power extracted from the shaft;

(b) means for using the difference to calculate a new set point for a manipulated parameter on the driver to reduce its power output accordingly; and (c) means for adjusting the manipulated parameter to meet the new set point.

11. The apparatus of claim 10, whereby the procedure is subsequently repeated.

12. An apparatus for preventing overspeed of rotating machinery consisting of a driver driving a load by way of a shaft, the rotating parts having a moment of inertia, I, and a rotational speed value, N, at which the machinery is said to have exceeded a speed threshold value, the apparatus comprising:

(a) means for defining the speed threshold value;

(b) means for measuring a rotational speed as a function of time;

(c) means for calculating a value of $IdN^2/2dt$, representing a difference in a power applied to the shaft and a power extracted from the shaft, when the rotational speed exceeds the speed threshold value;

(d) means for determining a new set point for a manipulated parameter for the driver, based on the power difference; and (e) means for adjusting the manipulated parameter to meet the new set point.

13. The apparatus of claim 12, wherein the means for determining a new set point for a manipulated parameter is based on the value of $IdN^2/2dt$ multiplied by a constant.

14. The apparatus of claim 12 which includes means for adjusting the manipulated parameter periodically, as long as the rotational speed exceeds the speed threshold value.

15. The apparatus of claim 12, whereby the manipulated parameter is also subject to means for closed-loop control.

16. An apparatus for reducing the magnitude of an angular acceleration of a driver driving a rotational load by way of a shaft, the entire set of rotating parts having a moment of inertia, I, and rotating at an angular speed, N, the apparatus comprising:

(a) means for using a value of $IdN^2/2dt$ as a measure of a difference between a power applied to the shaft and a power extracted from the shaft;

(b) means for using the difference to calculate a new set point for a manipulated parameter on the load to increase its power consumption accordingly; and (c) means for adjusting the manipulated parameter to meet the new set point.

* * * * *

UNITED STATES PATENT AND TRADEMARK OFFICE
CERTIFICATE OF CORRECTION

PATENT NO. : 5,609,465
DATED      : March 11, 1997
INVENTOR(S) : Brett W. Batson, et al.

It is certified that error appears in the above-indentified patent and that said Letters Patent is hereby corrected as shown below:

at column 1, line 52, insert --is-- before "the" (first occurance).

at column 2, line 48, delete "(105)" and insert --105--.

at column 3, line 17, delete "Of" and insert --of--.

In the Claims at column 3, line 45, (line 6 of Claim 2) delete "IdN²2dt" and insert -- $IdN^2/2dt$ as--.

In the Claims at column 4, line 40, (line 14 of Claim 9) delete "dN²/at:" and insert -- $dN^2/dt$ --.

Signed and Sealed this

Twenty-second Day of July, 1997

*Attest:*

BRUCE LEHMAN

*Attesting Officer*     Commissioner of Patents and Trademarks